(12) United States Patent
Mourieras

(10) Patent No.: US 11,381,063 B2
(45) Date of Patent: Jul. 5, 2022

(54) ASSEMBLY FOR PROTECTING AND SECURING A WIRING HARNESS

(71) Applicant: LATELEC, Labege (FR)

(72) Inventor: Julien Mourieras, Labege (FR)

(73) Assignee: LATELEC, Toulouse (FR)

( * ) Notice: Subject to any disclaimer, the term of this patent is extended or adjusted under 35 U.S.C. 154(b) by 0 days.

(21) Appl. No.: 17/268,927

(22) PCT Filed: Aug. 1, 2019

(86) PCT No.: PCT/EP2019/070833
§ 371 (c)(1),
(2) Date: Feb. 16, 2021

(87) PCT Pub. No.: WO2020/038701
PCT Pub. Date: Feb. 27, 2020

(65) Prior Publication Data
US 2021/0344179 A1   Nov. 4, 2021

(30) Foreign Application Priority Data
Aug. 20, 2018 (FR) ...................................... 18 57534

(51) Int. Cl.
*B64D 41/00* (2006.01)
*H02G 1/08* (2006.01)
(Continued)

(52) U.S. Cl.
CPC ........... *H02G 3/0406* (2013.01); *B64D 41/00* (2013.01); *H02G 1/08* (2013.01); *H02G 3/0481* (2013.01);
(Continued)

(58) Field of Classification Search
CPC ...... H02G 3/0406; H02G 1/08; H02G 3/0481; H02G 3/0487; H02G 3/32; H02G 3/34; B64D 41/00
(Continued)

(56) References Cited

U.S. PATENT DOCUMENTS 7,592,546 B2 * 9/2009 Johansson ............ H02G 3/0487
174/95
8,253,021 B2 * 8/2012 Adachi .................... H02G 3/26
174/72 A
(Continued)

FOREIGN PATENT DOCUMENTS

| EP | 0614258 A1 | 9/1994 |
| GB | 2504766 A | 2/2014 |
| KR | 20130001739 U | 3/2013 |

*Primary Examiner* — Timothy J Thompson
*Assistant Examiner* — Michael F McAllister
(74) *Attorney, Agent, or Firm* — Im IP Law; Chai Im; C. Andrew Im

(57) ABSTRACT

An assembly, configured to be mounted on a structure, includes a duct in the form of a hollow tubular body of which an inner space defines a zone for receiving a wiring harness. The duct is flexible and includes a longitudinal slot. The assembly includes attachment lugs rigidly connected to the duct and configured to be assembled to the structure. The assembly includes, at longitudinal edges of the duct, on either side of the slot, a pair of recesses with one recess per longitudinal edge. The receiving zone is compartmentalized into two longitudinal channels by a longitudinal separator extending from a longitudinal base of the duct to the slot. The separator has a recess in the same cross-section as the pair of recesses of the duct. The assembly includes a clamping member configured to be inserted into the pair of recesses of the duct and the recess of the separator.

7 Claims, 5 Drawing Sheets

(51) Int. Cl.
    *H02G 3/32*         (2006.01)
    *H02G 3/34*         (2006.01)
    *H02G 3/04*         (2006.01)

(52) U.S. Cl.
    CPC ............ *H02G 3/0487* (2013.01); *H02G 3/32* (2013.01); *H02G 3/34* (2013.01)

(58) Field of Classification Search
    USPC ........................................................ 174/480
    See application file for complete search history.

(56) References Cited

U.S. PATENT DOCUMENTS

| | | | |
|---|---|---|---|
| 8,613,411 B1 * | 12/2013 | Mohns | F16L 3/1226 248/68.1 |
| 9,265,345 B2 * | 2/2016 | Lindblom | A47B 97/00 |
| 9,438,016 B1 * | 9/2016 | Campos | H02G 3/0406 |
| 2007/0034750 A1 * | 2/2007 | Pierce | F16L 3/23 248/49 |
| 2009/0094799 A1 | 4/2009 | Ashel | |
| 2014/0311770 A1 * | 10/2014 | Chen | H02G 3/0431 174/135 |

* cited by examiner

ASSEMBLY FOR PROTECTING AND SECURING A WIRING HARNESS

RELATED APPLICATIONS

This application is a § 371 application of PCT/EP2019/070833 filed Aug. 1, 2019, which claims priority from French Patent Application No. 18 57534 filed Aug. 20, 2018, each of which is incorporated herein by reference in its entirety.

FIELD OF THE INVENTION

The present invention belongs to the field of installing wiring harnesses, in particular electrical.

The invention finds an advantageous application in the aeronautical field, for equipping an aircraft.

BACKGROUND OF THE INVENTION

In an aircraft, the electrical equipment is interconnected by means of wiring harnesses. A wiring hardness is formed by one or more clusters of cables equipped with connections at the ends. A cluster of cables generally comprises one or more electrical cables.

These electrical cables must be perfectly held and protected, in particular from attacks liable to damage them, such as for example vibrations, splashes of liquid, high temperatures, electromagnetic radiations, etc.

Currently, prior to the installation and attachment thereof in the aircraft, wiring clusters are protected locally by a sheath. This protection operation is performed at the production workshop, outside the aircraft. This operation of protecting the wiring harnesses needs to be meticulous since the operator must choose the sheath according to the diameter thereof so that it corresponds to the number of electrical cables that will pass therethrough and according to the protection required (temperature and/or electromagnetic radiations, etc.). Next, the wiring harnesses are attached to the structure of the aircraft by attachment collars and in particular are arranged so as to prevent the electrical cables being in contact with the structure and thus prevent damage by friction under the effect of vibrations in flight.

These operations, of protecting and then attaching the wiring harnesses, are very time consuming.

In addition, since the sheaths are installed away from the aircraft, it may turn out that the electrical cables are protected unnecessarily in certain areas of the aircraft.

Such overprotection of the electrical cables necessarily increases the weight of the aircraft.

OBJECT AND SUMMARY OF THE INVENTION

The present invention aims to remedy the aforementioned drawbacks.

For this purpose, the present invention proposes an assembly intended to be mounted on a structure. Said assembly comprises a duct in the form of a hollow tubular body, of longitudinal axis X, an internal volume of which defines a receiving zone for at least one cluster of cables or any other filamentary element. The duct is advantageously flexible. The duct is preferentially slit in whole or in part along the longitudinal axis X. In other words, the duct preferentially comprises a longitudinal slot along the longitudinal axis X. The duct preferentially comprises a longitudinal base. The assembly further comprises at least one attachment lug rigidly connected to the duct, preferably a plurality of attachment lugs. Each attachment lug is intended to be assembled to the structure.

Cluster of cables means one or more cables, in particular electrical.

Such an assembly, through the flexibility of the duct, allows easy manipulation, particularly advantageous when the duct must be installed in a location that is difficult of access. In addition, depending on the arrangement required, it is possible to give the duct, because of the flexibility thereof, curvatures in order to route the at least one cluster of cables in complete safety.

The duct is advantageously produced from a material that allows the deformation thereof, in particular at the longitudinal slot along the longitudinal axis X to allow the separation thereof and thus to have access to the receiving zone in order to introduce therein or to extract therefrom the cluster or clusters of cables.

The duct is also advantageously produced from a material that is sufficiently rigid not to cause any opening/gapping at the longitudinal slot, the at least one cluster of cables thus always remaining protected.

The duct does not have any deformation over the cross section thereof, in particular at the curvatures. The at least one cluster of cables thus does not undergo any crushing in the duct.

The material of the duct is for example produced from elastomer.

The duct may integrate one or more functionalities, for example by adding wires and/or fibrous reinforcements and/or specific fabrics, in order to adapt to precise environmental stresses. Thus an electromagnetic shielding function, a lightning protection function or a function of protection against high temperatures may in particular be associated with the duct.

The duct may have various longitudinal dimensions, according to requirements.

The duct may also have various shapes and diameters of cross sections, according for example to the surrounding available volume.

The assembly according to the invention, comprising such a duct associated with the attachment lugs rigidly connected to the duct, advantageously makes it possible to reduce the time for installing the duct on a structure. This is because, since the attachment lugs are rigidly connected to the duct, there is no longer any need to adapt attachment collars of the prior art to the duct in order to attach it to the structure. In addition, since the attachment lugs are already integrated in the duct, there is no longer any risk of loss of these elements when they are attached to the structure.

The attachment lugs are preferentially produced by overmoulding onto the duct.

At least one attachment lug is preferentially arranged at each end of the duct.

The attachment lugs are preferentially attached to a fixed support of the structure, each via an attachment element.

The assembly comprises, at longitudinal edges of the duct, situated on either side of the longitudinal slot, a pair of through-holes with one through-hole per longitudinal edge.

The receiving zone is compartmentalised into two longitudinal channels by a longitudinal separator. The longitudinal separator extends from the longitudinal base towards the longitudinal slot.

Each longitudinal channel can thus receive one or more clusters of cables. Such a longitudinal separator advantageously makes it possible to route the clusters of cables parallel and without contact.

The longitudinal separator comprises a through-hole, in the same cross section as the pair of through-holes of the duct.

The assembly comprises a clamping element configured to be inserted in the pair of through-holes of the duct and in the through-hole of the longitudinal separator.

The clamping element is arranged in the duct so as to grip the at least one cluster of cables situated in the receiving zone to enable the holding thereof in position and to prevent the wear thereon by friction. The duct thus no longer needs to be to the dimensions (in cross section) of the at least one cable placed in its internal volume. It is no longer necessarily useful to choose a particular duct according to the number and diameter of the cable or cables contained in the cluster of cables, which can give rise to a not insignificant saving in time for an operator.

The clamping element also makes it possible to grip the duct at the longitudinal slot and to prevent any unexpected opening due to an exceptional event.

In particular example embodiments of the invention, the clamping element is a hoop or a self-locking clamping collar.

In one embodiment, the assembly comprises a pair of through-holes arranged substantially in proximity to a attachment lug.

Such an assembly advantageously offers firstly complete protection all around the cluster of cables by means of the duct, which is advantageously produced from a material that is sufficiently rigid not to cause any opening/gapping at the longitudinal slot, and secondly gripping and holding in position of the clusters of cables in each longitudinal channel of the duct by the holding element.

Such an assembly is preferentially intended for the aeronautical field, to equip an aircraft, but may also be intended for any other field, such as the railway field or the automobile field, without this list being exhaustive.

According to particular embodiments, the assembly according to the invention also meets the following features, implemented separately or in each of the technically feasible combinations thereof.

Preferentially, a pair of through-holes is arranged in proximity to each attachment lug, at the two ends of the duct.

In preferred embodiments of the invention, the at least one clamping element is a separate element independent of the assembly. The at least one clamping element is an attached piece.

In preferred embodiments of the invention, the assembly comprises the at least one clamping element configured to be inserted in a pair of through-holes. Said at least one clamping element is not rigidly connected to the duct.

In preferred embodiments of the invention, the assembly comprises at least one anti-rotation device configured to prevent rotation of the duct during its attachment to the structure. Such an anti-rotation device makes it possible to maintain the orientation of the duct in an imposed initial required path, representing the optimum configuration of the routing of the cable.

In particular example embodiments of the invention, the anti-rotation device comprises a tip comprising a protuberance that cooperates with a recess formed in the duct. Said tip is not rigidly connected to the duct. It is preferentially arranged at an attachment lug of the duct and is intended to be attached to the fixed support of the structure, via the attachment element attaching the attachment lug to said fixed support.

The invention also relates to an aircraft comprising an assembly as defined above in one of the embodiments thereof, said assembly being attached to a fixed support of the structure of said aircraft via at least one attachment element. The assembly is in particular intended to receive at least one wiring harness. A wiring harness is formed by at least one cluster of cables, in particular electrical, equipped with connections at the ends.

Installing such an assembly in an aircraft is simplified compared with the existing one. The protection and attachment operations are performed directly and advantageously in the aircraft. It is no longer necessary to perform the operation of protecting the cluster of cables in the workshop.

Such an assembly is not intended to be installed from one end of a wiring harness to the other in order to protect all the clusters of cables. Such an assembly is preferentially intended to be installed in the specific areas that require protection of the cables. Action is taken locally, according to requirements. Thus the protection of the cables is limited solely in the necessary areas, making it possible to reduce the weight of these protections and to limit the impact thereof on the weight of the aircraft.

The assembly according to the invention can respond to a plurality of arrangements in an aircraft. Thus if, during the life of the aircraft, a rearrangement of the routing of the cables must be performed, giving rise to a modification of the locations for attaching the clusters of cables, it suffices to extract the cluster or clusters of cables from the duct, to give the duct a new route, to attach them at the new locations, and to reintroduce the clusters of cables into the duct.

The invention also relates to a method for installing an assembly, as defined above in one of the embodiments thereof, on the structure, comprising the steps of:
  positioning an anti-rotation device on the structure,
  attaching the duct on the structure, via at least one attachment element,
  inserting a clamping element in the receiving zone of the duct, the clamping element being introduced into a first through-hole of the pair of through-holes, and then into the through-hole of the longitudinal separator, and re-emerging through a second through-hole of the pair of through-holes,
  inserting the at least one cluster of cables in the receiving zone of the duct,
  closing the duct by means of said clamping element.

Such a method makes it possible to grip and hold in position the clusters of cables in each longitudinal channel of the duct by this same holding element.

BRIEF DESCRIPTION OF THE DRAWINGS

The invention will be better understood from a reading of the following description made with reference to the accompanying drawings.

DETAILED DESCRIPTION OF AN EMBODIMENT OF THE INVENTION

Figure 1:
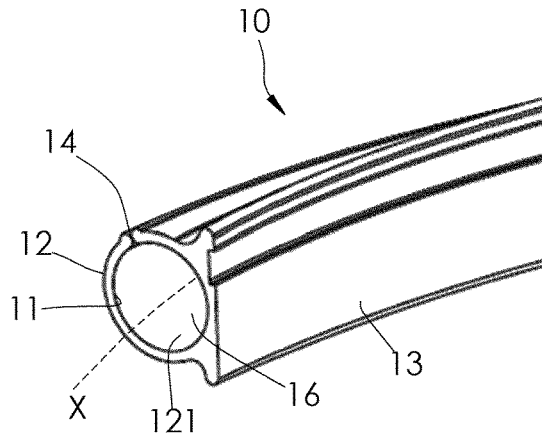
FIG. 1 illustrates an example of a cross section of a duct of an assembly according to the invention.

The present invention relates to an assembly 100 in particular intended for the routing, protection and holding of at least one cluster of cables, in particular electrical, 80 on a structure 200.

It is clear that any filamentary element, whether it be electrical or not, for example a wire, an optical fibre, etc, can be placed in the assembly instead of a cluster of cables, without limiting the scope of the invention. It may also be a case of a wiring harness.

The assembly 100 according to the invention may, in general terms, equip any transport means, in particular those of the aeronautical, railway or automobile fields, without this being restrictive of the invention. It can also be envisaged installing such an assembly in buildings.

The invention is described in the particular context of one of the preferred fields of application thereof wherein the assembly is arranged in an aircraft, whether it be civil or military. Nothing however excludes arranging the assembly in any other transport means.

The structure 200 on which the assembly 100 will come to be attached is for example an aircraft fuselage element. More precisely, the assembly 100 is intended to be attached to a fixed support 210 of the structure 200. The fixed support 210 is a part that is conventional in itself and can for example take the form of an angle bracket, an omega or a Z. The fixed support 210 comprises an orifice 220 for passage of an attachment element 90.

The assembly 100 according to the invention comprises a duct 10 in the form of a hollow tubular body, of longitudinal axis X.

The duct 10 may have any length, according to the required use. Two ducts 10 may be abutted lengthways if necessary.

Figure 2:
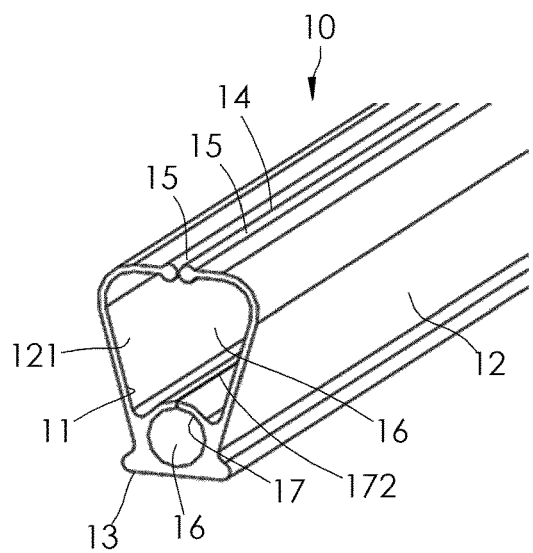
FIG. 2 illustrates a second example of a cross section of a duct of an assembly according to the invention.
Figure 3:
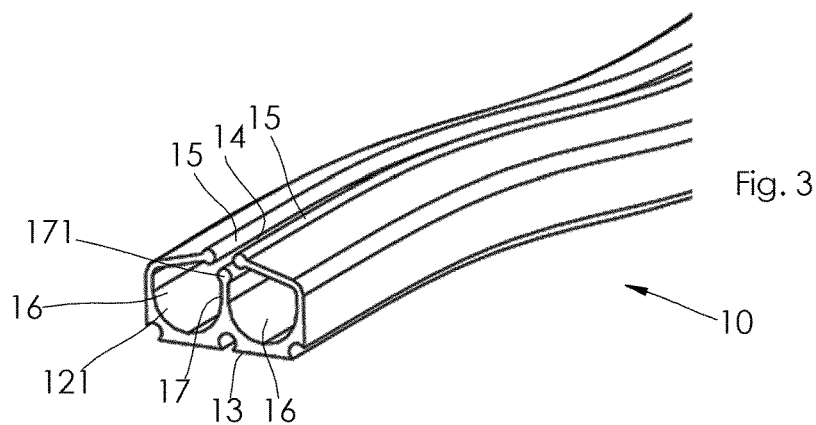
FIG. 3 illustrates a third example of a cross section of a duct of an assembly according to the invention.

The duct 10 may have any type of cross section, for example a circular cross section, a trapezoidal cross section or a rectangular cross section, cross sections illustrated respectively in FIGS. 1 to 3.

The duct 10 comprises an internal wall 11 and an external wall 12. The internal wall 11 delimits an internal volume defining a receiving zone 121 for the at least one cluster of cables 80.

The duct 10 comprises a longitudinal base 13, intended to come to face the structure 200 on which it is intended to be attached.

The duct 10 is split along the longitudinal axis X, over all or part of the length thereof. In other words, the duct preferentially comprises a longitudinal slot along the longitudinal axis X.

Preferentially, said duct is split over the entire length thereof. Such a configuration allows access to the receiving zone, anywhere along the duct. Access to the receiving zone, via the longitudinal slot 14, may prove to be advantageous in numerous circumstances, in order to carry out a repair or a replacement of the at least one cluster of cables situated therein, or to effect a connection with another cluster of cables situated outside the duct.

The duct 10 is naturally closed on itself, the longitudinal edges 15 of the duct 10, situated on either side of the longitudinal slot 14, being abutted. The introduction or removal of the at least one cluster of cables 80 is effected simply by separating the longitudinal edges 15 in order to widen the longitudinal slot 14.

The duct 10 is preferentially produced from a flexible material.

Figure 10:
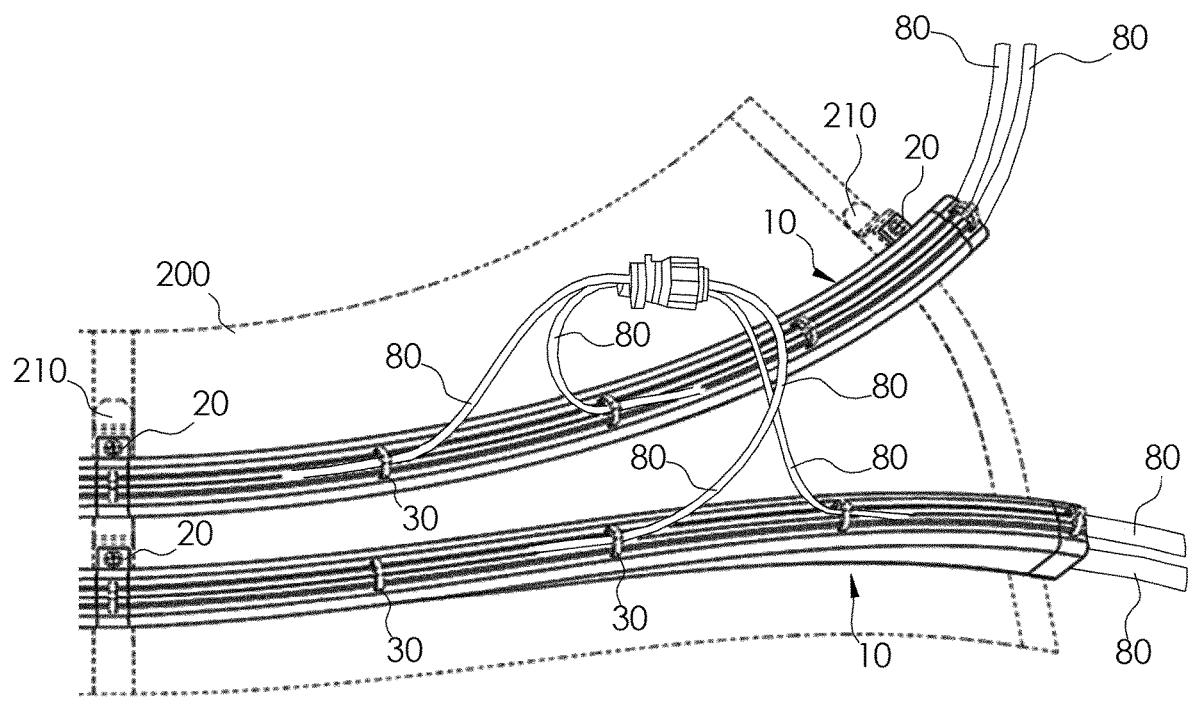
FIG. 10 illustrates an example of positioning of two ducts on a structure.

The use of such a duct advantageously makes it possible to impart to the assembly one or more radii of curvature, without damaging the at least one cluster of cables 80 situated in the duct. FIG. 10 illustrates two ducts having different radii of curvature.

The duct 10 is manufactured from a material that is sufficiently rigid to remain closed, that is to say with the longitudinal edge 14 abutted, but sufficiently elastic to be opened easily, by simply separating said longitudinal edges.

In an example embodiment, the duct 10 is produced from an elastomer material, for example of the silicon type.

In variant embodiments, the duct 10 comprises fibrous reinforcements or fabrics suited to precise environmental constraints, for example in order to protect the at least one cluster of cables from an environment at high temperature.

In one embodiment, the receiving zone 121 is in the form of a single longitudinal channel 16, as illustrated in FIG. 1.

In another embodiment, illustrated in FIGS. 2 and 3, the receiving zone 121 is compartmentalised in a plurality of longitudinal channels 16. Two adjacent longitudinal channels are separated by a longitudinal separator 17. Each longitudinal channel 16 receives at least one cluster of cables 80.

Preferentially, the longitudinal separator extends over the entire length of the duct. Such a configuration advantageously makes it possible to route wiring harnesses in parallel, sometimes with different functions, without them being in contact.

FIGS. 2 and 3 illustrate two examples of ducts 10 comprising two longitudinal channels 16.

In one embodiment, illustrated in FIG. 3, a longitudinal separator 17 is positioned so that each longitudinal channel 16 is accessible through the longitudinal slot 14 of the duct 10. The longitudinal separator 17 starts from the internal wall 11 of the duct 10 and extends in the direction of said longitudinal slot of said duct. At least one cluster of cables 80 in each longitudinal channel 16 is introduced through the longitudinal slot 17 of the duct 10.

Figure 11:
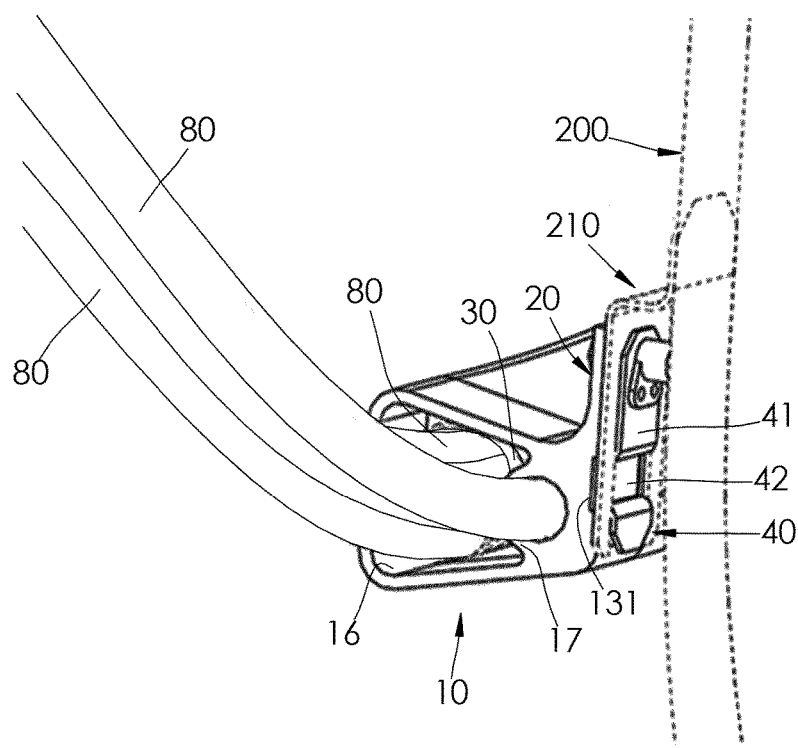
FIG. 11 illustrates a perspective view of one end of an assembly containing clusters of cables.

In another embodiment, illustrated in FIGS. 2 and 11, the longitudinal separator 17 starts from a part of the internal wall 11 and extends in the direction of another part of the internal wall 11. In this embodiment, the longitudinal separator 17 comprises a longitudinal slot 172. The longitudinal slot 172 of said longitudinal separator is preferentially arranged opposite the longitudinal slot 14 of the duct 10. The volume defined by the longitudinal separator 17 defines a second longitudinal channel. A cluster of cables 80 is introduced into this second longitudinal channel successively through the longitudinal slot 14 of the duct 10 and then through the longitudinal slot 172 of the longitudinal separator 17. In this embodiment, the longitudinal separator is preferentially arranged in the receiving zone so that the second longitudinal channel is sized, in cross section, so as to receive, in a close-fitting manner, a single cluster of cables 80, as illustrated in FIG. 11. The other longitudinal channel for its part can receive one or more clusters of cables, which will be held together by a specific means, referred to as a clamping element, described below.

The assembly 100 further comprises at least one attachment lug 20 rigidly connected to the duct 10, as illustrated in FIGS. 4 to 9.

In the present description, by convention, "rigidly connected" means parts that are mutually connected in a fixed manner, that is to say so that a relative movement between them is impossible.

The attachment lug 20 is intended to be placed against the fixed support 210 of the tructure 200. The attachment lug 20 advantageously provides the interface between the duct 10 and the fixed support 210.

The attachment lug 20 has a substantially flat bearing face 21 that enables the duct 10 to bear on the fixed support 210 of the structure 200.

The attachment lug 20 preferentially extends from the longitudinal base 13 of the duct 10.

The attachment lug 20 is provided with an orifice 22 for passage of an attachment element 90, such as for example a screw or a nut.

In one embodiment, the attachment lug 20 is advantageously assembled fixedly on the duct, for example by overmoulding.

Preferentially, the assembly 100 comprises a plurality of attachment lugs 20 on the duct 10. The attachment lugs 20 are advantageously arranged on the duct 10, at regular and predefined intervals.

Preferably, the duct 10 comprises an attachment lug 20 at each of the ends 18 thereof.

Figure 5:
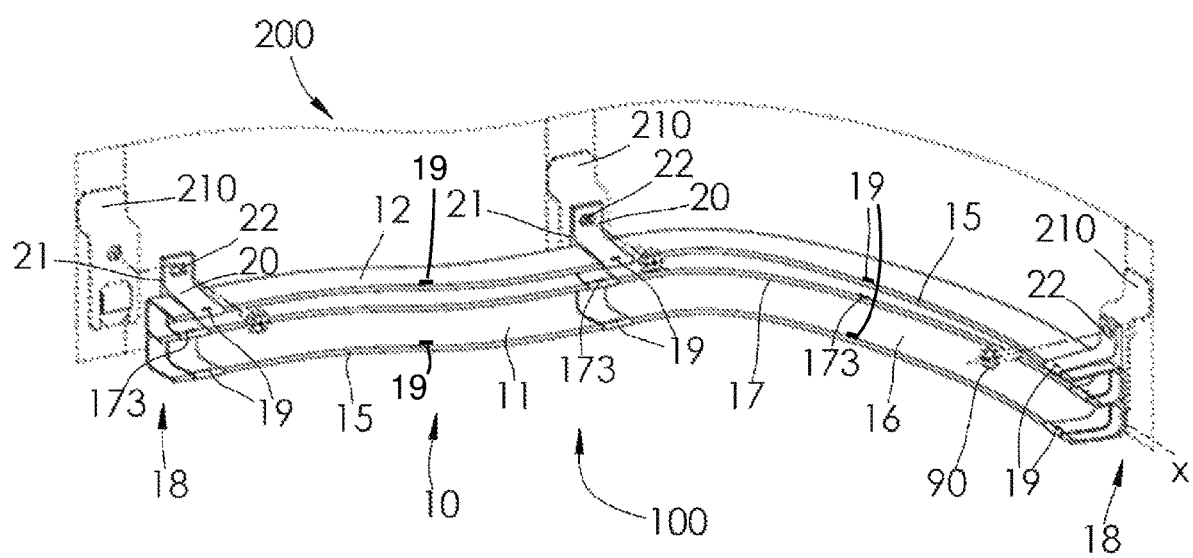
FIG. 5 illustrates the positioning and the attachment of the duct on the structure.

In the non-limitative example of FIG. 5, the assembly 100 comprises three attachment lugs 20, one attachment lug at each end of the duct and an attachment lug substantially half-way along the duct 10.

The duct 10 comprises, at the longitudinal ends 15 thereof, at least one pair of through-holes 19, one through-hole on either side of the longitudinal slot 14 of the duct 10.

The through-holes 19 of a pair of through-holes are arranged substantially in the same cross section of the duct.

The through-holes 19 are used to allow passage of a clamping element 30, such as for example a hoop, a self-locking clamping collar, or a self-locking or self-adhesive fastener.

The clamping element 30 has a dual role. It forms firstly a closure element for the duct 10 by tightening said duct by bringing together the longitudinal ends 15 of the duct 10. Secondly, it forms an element for protecting the at least one cluster of cables 80 in its longitudinal channel 16, by holding it in position in order to prevent in particular the cables constituting it wearing by friction against the internal wall 11 of the duct. FIG. 10 shows the clamping element holding in position a plurality of clusters of cables in one of the longitudinal channels.

In a preferred embodiment, the duct 10 comprises a plurality of pairs of through-holes 19, preferentially distributed regularly along the duct.

In one example embodiment, the duct comprises a pair of through-holes 19 arranged in proximity to each attachment lug 20.

In the non-limitative example in FIG. 5, the duct 10 comprises five pairs of through-holes 19, three in proximity to the three attachment lugs 20 and one interposed half-way between each attachment lug 20.

When the duct comprises at least two longitudinal channels 16, with at least one longitudinal separator 17 that extends from the longitudinal base 13 towards the longitudinal slot 14 of the duct, said at least one longitudinal separator 17 comprises a through-hole 173, in each same cross section as a pair of through-holes 19 of the duct.

In the same cross section of the duct 10, a through-hole 173 of a longitudinal separator 17 is intended to receive the same clamping element 30 as the associated pair of through-holes 19. The number of clamping elements is thus limited. The same clamping element 30 grips the clusters of cables arranged in each longitudinal channel and advantageously holds them in position in each longitudinal channel, and therefore in the duct, limiting the wear by friction against the internal wall of said duct.

The through-hole 173 of a longitudinal separator 17 is preferentially arranged in proximity to a free end 171 of the longitudinal separator 17, that is to say to the end situated on the same side as the longitudinal slot 14 of the duct.

In a preferred embodiment, the assembly 100 comprises an anti-rotation device 40 configured to prevent the rotation of the duct 10 when an attachment element 90 is clamped, by screwing/bolting or the like, to a fixed support 210 of the structure 200.

Figure 4:
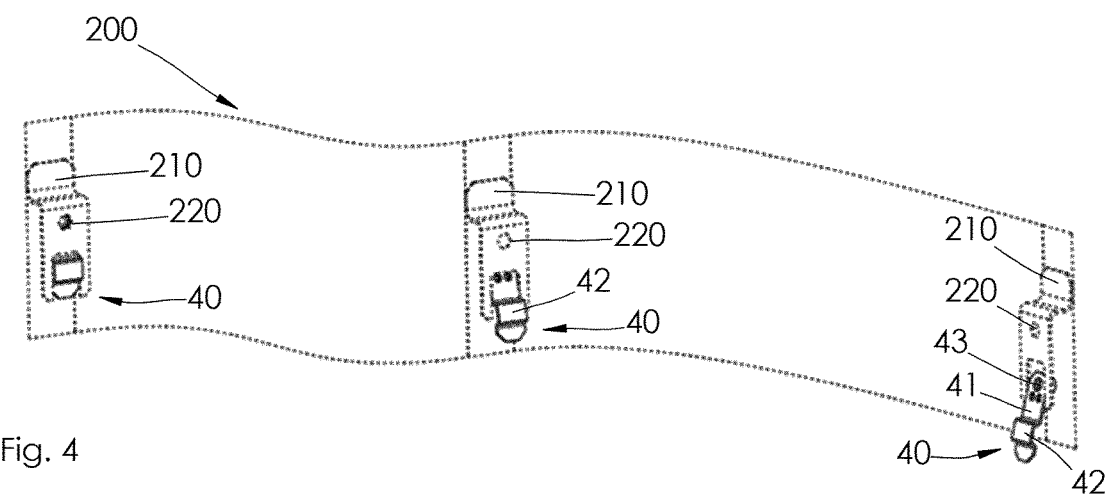
FIG. 4 illustrates the positioning of the attachment lugs of the assembly on a structure.

In an example embodiment, the anti-rotation device 40 is in the form of a tip 41 intended to be inserted between the fixed support 210 and the structure 200, as illustrated in FIG. 4.

The fixed support, illustrated in FIGS. 4 to 9 and 11, is in the form of an angle bracket. The fixed support comprises an orifice 220 for passage of the attachment element 90.

The tip 41 comprises a protuberance 42 intended to be inserted in a recess 131 formed in the longitudinal base 13 of the duct 10, in line with an attachment lug.

It is also possible to imagine an opposite configuration, wherein the tip comprises a recess and the longitudinal base of the duct comprises a protuberance, the recess and the protuberance cooperating in order to lock the duct with respect to rotation.

The tip 41 further comprises an orifice 43 for passage of the attachment element. Said orifice of the tip is intended to be opposite the orifice 22 of the attachment lug 20 when the recess 131 and the protuberance 42 cooperate.

The assembly 100 advantageously comprises as many anti-rotation devices 40 as there are attachment lugs 20 on the duct.

FIG. 10 illustrates two ducts each comprising a cluster of cables, for example with different functions. Each duct is attached independently to the structure with a distinct privileged direction, illustrating the flexibility capacity of the ducts.

By virtue of their longitudinal slots 14, it is possible to locally extract one of the clusters of cables from each duct and to reintroduce them into the other duct, as illustrated in FIG. 10.

FIGS. 4 to 8 illustrate various steps of a method for installing an assembly 100 on a structure 200.

By way of non-limitative example, the method is described with an example of an assembly 100 comprising a duct 10 with two longitudinal channels 16, separated by a longitudinal separator 17 extending from the longitudinal base 13 towards the longitudinal slot 14 of the duct 10.

Figure 6:
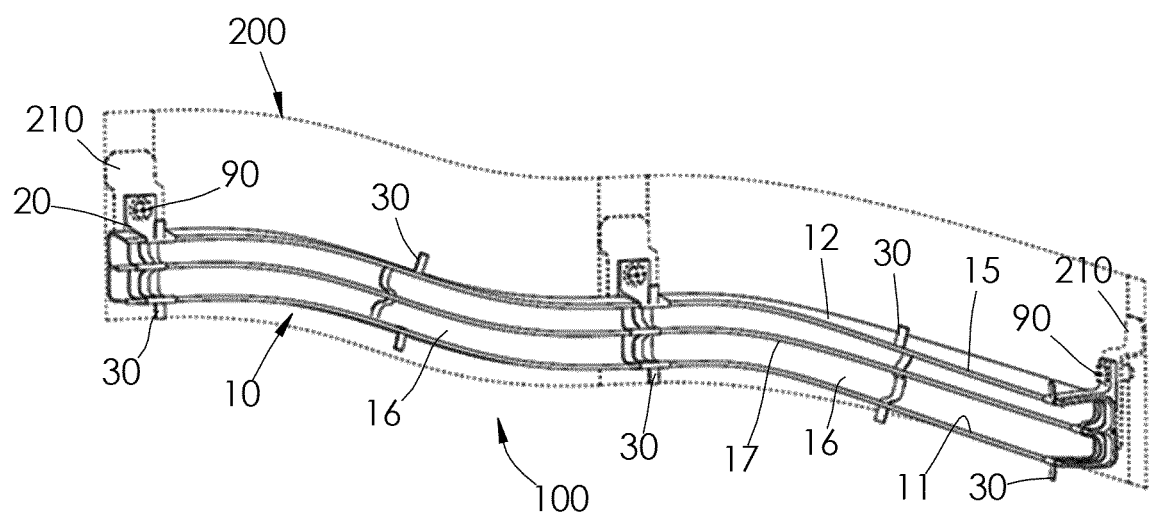
FIG. 6 illustrates the placing of the clamping elements on the duct.
Figure 7:
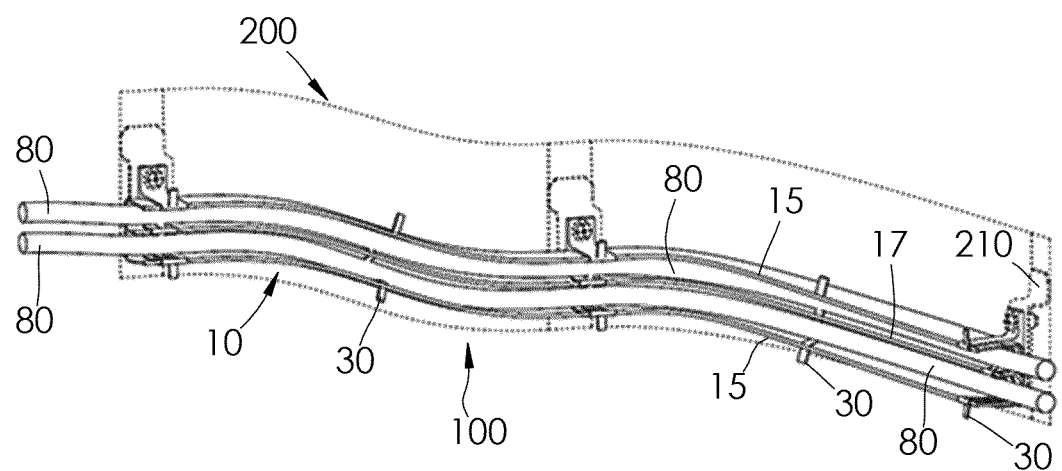
FIG. 7 illustrates the placing of the clusters of cables in the duct.

FIGS. 5 to 7 illustrate the duct 10 with its longitudinal edges 15 separated, for better display.

In a first step, the anti-rotation devices 40 are placed at the structure 200.

The tip 41 is placed between the fixed support 210 and the structure 200 so that the orifice 43 of said tip comes opposite the orifice 220 of the fixed support 210. The protuberance 42 of the tip 40 projects from the fixed support 210.

FIG. 4 illustrates, from right to left, the gradual insertion of the tip 41 between the fixed support 210 and the structure 200.

In a second step, the duct 10 is attached to the fixed support 210 of the structure 200.

The duct 10 is arranged so that the longitudinal base 13 thereof is placed on the side of the fixed supports 210. The orifices 22 of each attachment lug 20 come opposite the orifices 220 of the associated fixed supports 210.

In positioning the duct 10, the protuberance 42 of each tip 40 fits in each recess 131 of the longitudinal base 13 of the duct 10.

The duct 10 is next assembled to the fixed support 210 by clamping of the attachment element on said fixed support.

FIG. 5 illustrates, from left to right, the gradual positioning of the duct 10 against the fixed support 210.

At the end of this step, each fixed support 210 is sandwiched between an attachment lug 20 and a tip 41. The orifices 22, 43, 220 of an attachment lug 20, of a tip 41 and of a fixed support 210 form only a single orifice. The duct 10 is fixedly held against the fixed support 210.

In a third step, the clamping elements 30 are installed in the duct 10, for each pair of through-holes 19.

A clamping element 30 is introduced into a first through-hole 19 of a pair of through-holes and emerges therefrom through a second through-hole in the pair of through-holes. Then the clamping element 30 is pressed against the internal surface of the duct.

When the duct 10 comprises a longitudinal separator 17, as illustrated in FIG. 6, for each pair of through-holes 19, a clamping element 30 is also introduced into the through-hole 173 of said longitudinal separator, after insertion in the first through-hole 19 but before it emerges through the second through-hole 19.

The order of implementation of steps 2 and 3 is not imposed and, depending on the method, can be implemented in an order different from the order described, without changing the result of said steps.

Likewise, the third step could be implemented prior to the first step, without changing the result of said steps.

In a fourth step, at least one cluster of cables 80 is introduced into the duct 10.

In a first phase, the longitudinal edges 15 of the duct are separated.

In a second phase, the at least one cluster of cables 80 is introduced into the receiving zone 121, via the longitudinal slot 14.

In a last phase, after the at least one cluster of cables 80 is inserted, the longitudinal edges 15 are released and return to the initial position thereof by elasticity while closing the duct 10.

The insertion of the at least one cluster of cables may be gradual.

When the duct 10 comprises a longitudinal separator 17, at least one cluster of cables 80 is introduced into each longitudinal channel 16. In the example illustrated in FIG. 7, a cluster of cables 80 is introduced into each longitudinal channel 16.

At the end of this step, the at least one cluster of cables is introduced into the duct, with the wiring element between the internal surface of the duct and the at least one cluster of cables. When the duct 10 comprises a longitudinal separator 17, the at least one cluster of cables 80 is introduced into each longitudinal channel 16, with the wiring element between the internal surface of the duct and the at least one cluster of cables in each longitudinal channel.

Figure 8:
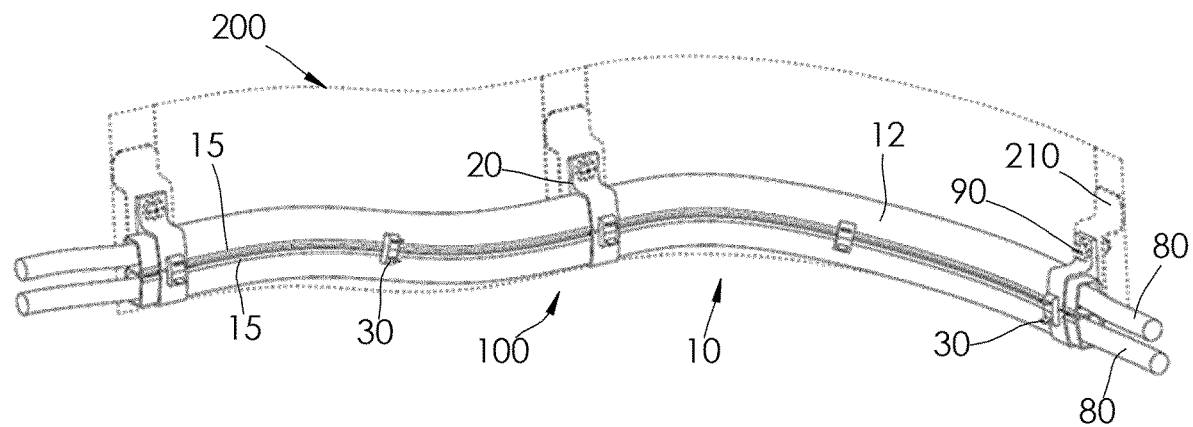
FIG. 8 illustrates the step of closing the duct.

In a last step, as illustrated in FIG. 8, the duct is closed. The duct 10 is closed by means of the clamping of the clamping element 30.

By closing the clamping element, each cable of the at least one cluster of cables is gripped in the locked position in its longitudinal channel 16, which is thus secured.

Figure 9:
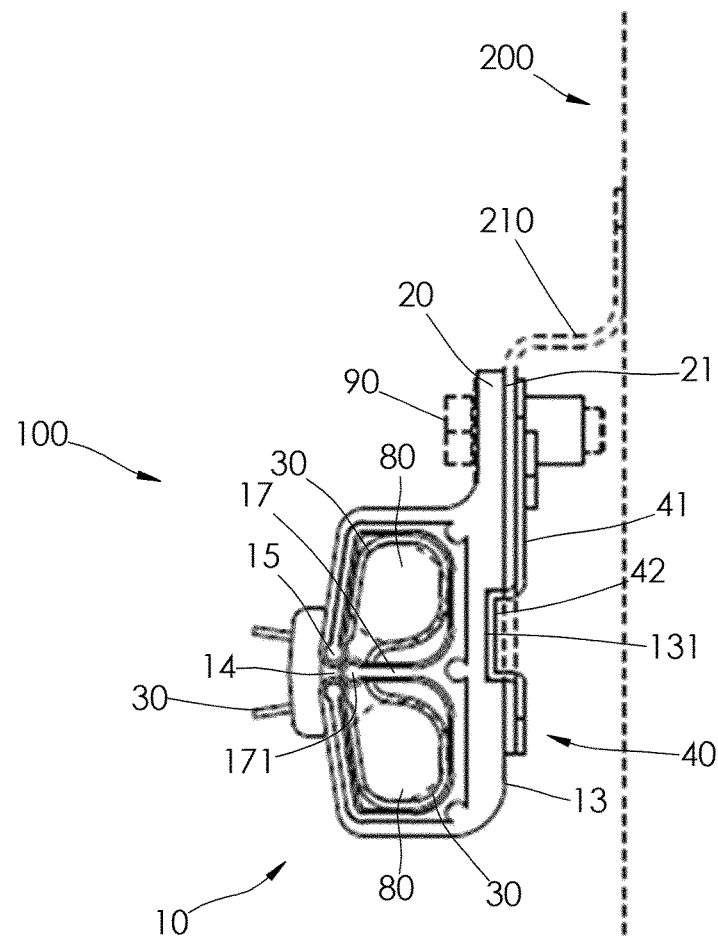
FIG. 9 illustrates a side view of the duct of FIG. 8.

FIG. 9 illustrates a side view of the duct of FIG. 8, at an attachment lug. The routing of the clamping element in the duct can be made out and the securing of the cable in each longitudinal channel is noted.

The above description illustrates clearly that, through its various features and advantages, the present invention achieves the objectives that it set for itself In particular, the invention provides an assembly affording protection of the cluster of cables in a way that is local and specific to requirements. The assembly has the advantage of being adapted so that the cluster of cables is held in a secure manner in the duct and on the fixed support, and able to be easily removed as required.

The invention claimed is:

1. An assembly configured to be mounted on a structure and the assembly comprising:
   a duct in the form of a hollow tubular body, of longitudinal axis, an internal volume of the duct defining a receiving zone for at least one cluster of cables, the duct being flexible and comprising a longitudinal slot and a longitudinal base;
   a plurality of attachment lugs rigidly connected to the duct, the plurality of attachment lugs being configured to be assembled to the structure;
   at longitudinal edges of the duct, situated on either side of the longitudinal slot, a pair of through-holes with one through-hole per longitudinal edge;
   wherein the receiving zone is compartmentalized into two longitudinal channels by a longitudinal separator, the longitudinal separator extending from the longitudinal base towards the longitudinal slot, the longitudinal separator comprising a through-hole, in a same cross section as the pair of through-holes of the duct; and
   a clamping element insertable in the pair of through-holes of the duct and in the through-hole of the longitudinal separator.

2. The assembly of claim 1, further comprising a pair of through-holes arranged substantially in proximity to each attachment lug.

3. The assembly of claim 1, further comprising an anti-rotation device configured to prevent rotation of the duct during an attachment of the duct to the structure.

4. The assembly of claim 3, wherein the anti-rotation device comprises a tip comprising a protuberance that cooperates with a recess formed in the duct.

5. The assembly of claim 1, wherein the duct is produced from an elastomer material.

6. An aircraft comprising the assembly of claim 1 and the structure, wherein the assembly is attached to a fixed support of the structure of the aircraft via at least one attachment element.

7. A method for installing an assembly on a structure, the assembly comprising:
   a duct in the form of a hollow tubular body, of longitudinal axis, an internal volume of the duct defining a receiving zone for at least one cluster of cables, the duct being flexible and comprising a longitudinal slot and a longitudinal base;
   a plurality of attachment lugs rigidly connected to the duct, the plurality of attachment lugs being configured to be assembled to the structure;
   at longitudinal edges of the duct, situated on either side of the longitudinal slot, a pair of through-holes with one through-hole per longitudinal edge; and wherein the receiving zone is compartmentalized into two longitudinal channels by a longitudinal separator, the longitudinal separator extending from the longitudinal base towards the longitudinal slot, the longitudinal separator comprising a through-hole, in a same cross section as the pair of through-holes of the duct;

the method comprising:

positioning an anti-rotation device on the structure, the anti-rotation device being configured to prevent rotation of the duct during an attachment of the duct to the structure;

attaching the duct on the structure via at least one attachment element;

inserting a clamping element in the receiving zone of the duct, the clamping element being introduced into a first through-hole of the pair of through-holes of the duct, then into the through-hole of the longitudinal separator, and re-emerging through a second through-hole of the pair of through-holes;

inserting said at least one cluster of cables in the receiving zone of the duct; and closing the duct by using the clamping element.

* * * * *